United States Patent [19]
Heider et al.

[11] 3,783,149
[45] Jan. 1, 1974

[54] α-L TALOMETHYLOSIDES OF CERTAIN GENINS OF THE CARDENOLIDE AND BUFADIENOLIDE SERIES

[75] Inventors: Joachim Heider, Warthausen-Oberhofen; Wolfgang Eberlein, Biberach, Riss, both of Germany; Walter Kobinger, Vienna, Austria

[73] Assignee: Boehringer Ingelheim GmbH, Ingelheim/Rhine, Germany

[22] Filed: Oct. 27, 1971

[21] Appl. No.: 192,992

[52] U.S. Cl. .............................. 260/210.5, 424/182
[51] Int. Cl. .................................... C07c 173/00
[58] Field of Search ............................ 260/210.5

[56] References Cited
UNITED STATES PATENTS

| | | | |
|---|---|---|---|
| 3,398,138 | 8/1968 | Lefebure et al. | 260/210.5 |
| 3,471,470 | 10/1969 | Heider et al. | 260/210.5 |
| 3,472,836 | 10/1969 | Vogelsang et al. | 260/210.5 |
| 3,585,187 | 6/1971 | Heider et al. | 260/210.5 |

*Primary Examiner*—Lewis Gotts
*Assistant Examiner*—Johnnie R. Brown
*Attorney*—Nelson Littell et al.

[57] ABSTRACT
Compounds of the formula

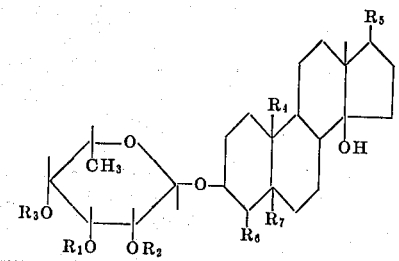

wherein $R_1$ and $R_2$ are each hydrogen or lower alkanoyl or, together with each other,

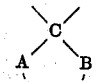

where
A is hydrogen or lower alkyl,
B is lower alkyl or phenyl, or
A and B, together with each other and the carbon atom to which they are attached, form a 6- to 7-membered saturated carbocyclic ring,
$R_3$ is hydrogen, lower alkanoyl or heterocyclic carboxylic acid acyl, such as isonicotinoyl or benzofuran-2-carbonyl,
$R_4$ is methyl, formyl or hydroxymethyl,
$R_5$ is the bufadienolide radical; or when $R_4$ is the methyl group or at least one of the radicals $R_1$ to $R_3$ is other than hydrogen, also the cardenolide radical,
$R_6$ is hydrogen or, together with $R_7$, a double bond, and
$R_7$ is hydroxyl or, when $R_5$ is the cardenolide radical, also hydrogen;
the compounds are useful as cardiotonics.

7 Claims, No Drawings

α-L TALOMETHYLOSIDES OF CERTAIN GENINS OF THE CARDENOLIDE AND BUFADIENOLIDE SERIES

This invention relates to a novel α-L-talomethylosides of certain genins of the cardenolide and bufadienolide series, as well as to a method of preparing these compounds.

More particularly, the present invention relates to a novel class of steroid glycosides of the formula

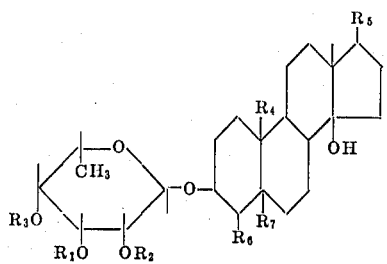

(I)

wherein $R_1$ and $R_2$ are each hydrogen or lower alkanoyl or, together with each other,

where
  A is hydrogen or lower alkyl,
  B is lower alkyl or phenyl, or
  A and B, together with each other and the carbon atom to which they are attached, form a 6- to 7-membered saturated carbocyclic ring, $R_3$ is hydrogen, lower alkanoyl or heterocyclic carboxylic acid acyl, such as isonicotinoyl or benzofuran-2-carbonyl, $R_4$ is methyl, formyl or hydroxymethyl, $R_5$ is the bufadienolide radical; or when $R_4$ is the methyl group or at least one of the radicals $R_1$ to $R_3$ is other than hydrogen, also the cardenolide radical, $R_6$ is hydrogen or, together with $R_7$, a double bond, and $R_7$ is hydroxyl or, when $R_5$ is the cardenolide radical, also hydrogen.

In other words, the compounds of the formula I are α-L-talomehyloside derivatives of the following genins:
  k-Strophanthidin,
  k-Strophanthidol,
  Scilliglaucosidin,
  Scilliglaucosidol,
  Hellebrigenin,
  Hellebrigenol,
  Scillarenin A or
  Digitoxigenin.

The compounds embraced by formula I may be prepared by reducing a 4'-oxo-rhamnosyl-glycoside of the formula

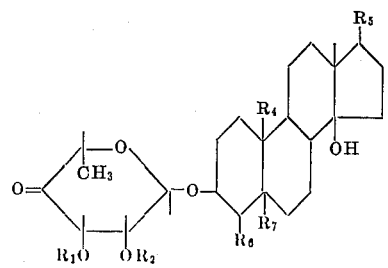

(II)

wherein $R_1$, $R_2$, $R_5$, $R_6$ and $R_7$ have the same meanings as in formula I and $R_4'$ is methyl or formyl, with a complex alkali metal hydride, preferably lithium tri-tert.butoxy aluminum hydride or sodium borohydride, at a temperature between −5° and +30° C in the presence of an anhydrous organic solvent. When the reduction is performed with lithium tritert-butoxy aluminum hydride the preferred solvent is anhydrous tetrahydrofuran, whereas anhydrous methanol is the preferred solvent medium when sodium borohydride is used.

The optimum reaction time depends largely upon the structure of the starting compound of the formula II and may readily be determined by periodic thin-layer chromatographic surveillance of the reaction progress.

If $R_4'$ in formula II is methyl, a reaction period of 3 to 4 hours is required for the achievement of a virtually complete reaction. On the other hand, if $R_4'$ in formula II is formyl, that is, if the starting compound is a derivative of scilliglaucosidin, hellebrigenin or k-strophanthidin, the reduction of the 4'-oxo group of the rhamnose moiety is, as a rule, complete after only a few minutes. Even when the reaction period is this short and the calculated amount of reducing agent or a slight excess is used, that is, 2 to 3 mols of lithium tri-tert-butoxy aluminum hydride or 0.25 to 0.4 mol of sodium borohydride per mol of starting compound, a small amount of the corresponding 19-hydroxy compound is always formed besides the desired reduction product; however, this amount is so small that it is not worthwhile to separate it during the chromatographic purification of the reaction mixture. Only when the starting compound is a derivative of scilliglaucosidin does the reduction yield a mixture of about equal amounts of the 19-formyl and the 19-hydroxymethyl compounds, even when the reaction time is only a few minutes and the calculated amount of reducing agent is employed. The 19-hydroxy compound is obtained exclusively or preponderantly when a large excess of the reducing agent is used, i.e., 4 mols or more of lithium tri-tert-butoxy aluminum hydride or 1 mol or more of sodium borohydride per mol of starting compound, and the reduction reaction is allowed to proceed for up to 1 hour.

A compound of the formula I wherein $R_3$ is acyclic or heterocyclic carboxylic acid acyl, as defined above, may be prepared by acylating pursuant to known methods the compound obtained from the reduction of the 4'-oxo-rhamnosylglycoside; the acylation is preferably carried out with the corresponding carboxylic acid anhydride in pyridine or with the corresponding carboxylic acid in the presence of dicyclohexyl-carbodiimide. In both cases the acylation is performed at room temperature or accompanied by cooling and requires a reaction time ranging from a few minutes up to 24 hours, depending upon the reactivity of the particular acylating agent which is used.

If the reduction yields a compound of the formula I wherein $R_1$ and $R_2$ are both hydrogen, these are simultaneously converted into the corresponding carboxylic acid radicals.

A compound of the formula I wherein $R_1$ and $R_2$ have the meanings defined in connection with formula I except hydrogen may, if desired, be converted by known methods, preferably by treatment with dilute acids, into the corresponding compound of the formula I wherein $R_1$ and $R_2$ are both hydrogen. The latter, in turn, may, if desired, be acylated by the above-mentioned methods with other carboxylic acyl radicals or acetalized or ketalized with a compound of the formula

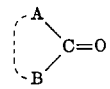

(III)

wherein A and B have the same meanings as in formula I, in the presence of anhydrous copper sulfate or p-toluenesulfonic acid.

The sarting compounds of the formula II may be prepared from the corresponding in 2'- and 3'-position acetalized or ketalized α-L-rhamnoside by oxidation with dimethylsulfoxide in the presence of dicyclohexylcarbodiimide, trifluoroacetic acid and pyridine; or by oxidation with dimethylsulfoxide in the presence of the pyridine-sulfurtrioxide-complex and triethylamine; or by oxidation with chromium trioxide, preferably a chromium trioxide-pyridine-complex.

The following examples further illustrate the present invention and will enable others skilled in the art to understand it more completely. It should be understood, however, that the invention is not limited solely to the particular examples given below.

In these examples the abbreviations used in conjunction with the $R_f$-values of the end products have the following meanings:

SGHF = silicagel HF, manufactured by E. Merck, Darmstadt, Germany;

SGG = silicagel G, manufactured by E. Merck; and

FA = flow agent.

EXAMPLE 1

3β-(2',3'-O-Isopropylidene-α-L-talomethylosyl)-5β,14β-dihydroxy-19-oxo-card-20(22)-enolide A solution of 1.8 gm (3 nillimols) of 3β-(2',3'-O-isopropylidene-4'-oxo-α-L-rhamnosyl)-5β,14β-dihydroxy-19-oxo-card-20(22)-enolide in 50 ml of tetrahydrofuran was cooled to 0° C, and 1.5 gm (6 millimols) of lithium tri-tert.butoxy aluminum hydride were added to the cold solution. The mixture was allowed to stand without cooling, and the progress of the reaction was checked by thin-layer chromatography; the reaction had gone to completion after only about 3 minutes, and during that time the reaction mixture had also reached room temperature. The reaction mixture was then neutralized with aqueous 10 percent acetic acid and extracted twice with chloroform. The combined chloroform extracts were washed with aqueous sodium bicarbonate, dried over sodium sulfate and evaporated to dryness in vacuo, leaving 1.8 gm of a residue which contained, in addition to the desired 19-oxo-compound, a small amount of the corresponding 19-hydroxy-card-20(22)-enolide, thereby necessitating a column separation on silicagel (0.2–0.5 mm) with chloroform/acetone (3:1). 1.4 gm (78 percent of theory) of the amorphous compound, melting range 120°–130° C, $R_f$-value 0.5 [SGHF: FA:Methyl ethyl ketone/xylene (5:2)], of the formula

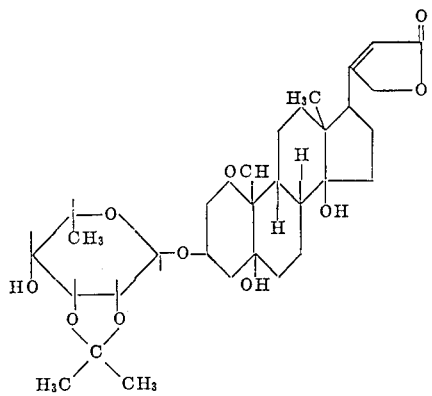

were obtained.

EXAMPLE 2

3β-(2',3'-O-Isopropylidene-4'-acetyl-α-L-talomethylosyl)-5β,14β-dihydroxy-19-oxo-card-20(22)-enolide A solution of 0.9 gm (1.5 millimols) of 3β-(2',3'-O-isopropylidene-α-L-talomethylosyl)-5β,14β-dihydroxy-19-oxo-card-20-(22)-enolide in 10 ml of pyridine was cooled to 0° C, and 2 ml of acetic acid anhydride were added thereto. After the reaction had gone to completion, which was determined by thin-layer chromatography, the temperature of the reaction mixture had risen to room temperature. The reaction solution was poured into ice water, the aqueous mixture was extracted twice with chloroform, and the combined organic extracts were washed with water until neutral, dried over sodium sulfate and evaporated to dryness, yielding 0.79 gm (83 percent of theory) of the amorphous compound of the formula

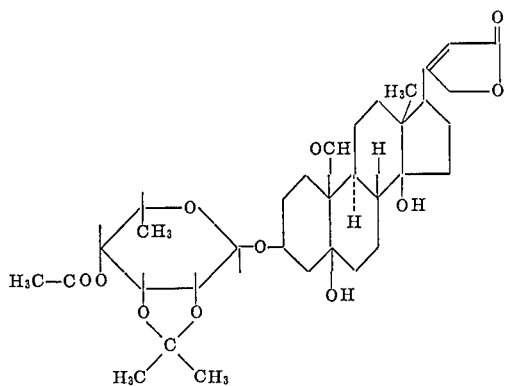

Melting range: 145°–152° C

R$_f$-Value: 0.6 [SGHF; FA: Methyl ethyl ketone/xylene (5:2)].

EXAMPLE 3

Using a procedure analogous to that described in Example 2, 0.32 gm (55 percent of theory) of amorphous 3β-(2',3'-O-isopropylidene-4'-isonicotinoyl-α-L-talomethylosyl)-5β,14β- dihydroxy-19-oxo-card-20(22)-enolide, melting range 125°–130° C, R$_f$-value 0.4 [SGHF; FA: Methyl ethyl ketone/xylene (5:2)], of the formula

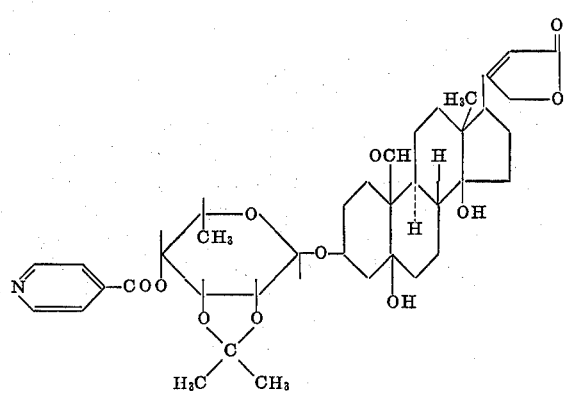

were obtained by reacting 0.5 gm (0.85 millimols) of 3β-(2',3'-O-isopropylidene-α-L-talomethylosyl)-5β,14β-dihydroxy-19-oxo-card-20(22)-enolide with 1 gm (4.3 millimols) of isonicotinic acid anhydride in pyridine/dioxane.

EXAMPLE 4

Using a procedure analogous to that described in Example 2, 0.3 gm (48 percent of theory) of amorphous 3β-(2',3'-O-isopropylidene-4'-benzofuroyl-α-L-talomethylosyl)-5β,14β-dihydroxy-19-oxo-card-20(22)-enolide, melting range 120°–130° C, R$_f$-value 0.65 [SGHF; FA: Methyl ethyl ketone/xylene (5:2)], of the formula

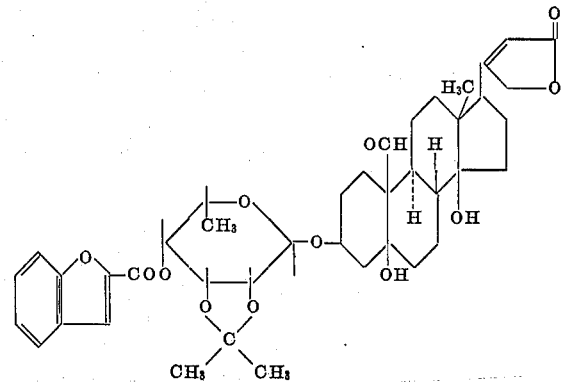

were obtained by reacting 0.5 gm (0.85 millimols) of 3β-(2',3'-O-isopropylidene-α-L-talomethylosyl)-5β,14β-dihydroxy-19-oxo-card-20(22)-enolide with 1 gm (3 millimols) of coumarilic acid anhydride in pyridine/dioxane.

EXAMPLE 5

Using a procedure analogous to that described in Example 1, 1.1 gm (69 percent of theory) of amorphous 3β-(2',3'-O-cyclohexylidene-α-L-talomethylosyl)-5β,14β-dihydroxy-19-oxocard-20(22)-enolide, melting range 117°–125° C, R$_f$-value 0.45 [SGHF; FA: Methyl ethyl ketone/xylene (5:2)], specific rotation $[\alpha]_D^{20}$ = −1.1° (c = 1, chloroform, of the formula

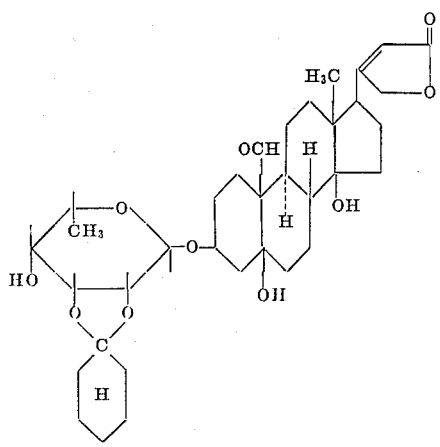

were obtained by reducing 1.6 gm (2.5 millimols) of 3β-(2',3',-O-cyclohexylidene-4'-oxo-α-L—rhamnosyl(-5β,14β-dihydroxy-19-oxo-card-20(22)-enolide with 1.3 gm (5 millimols) of lithium tri-tert-butoxy aluminum hydride.

EXAMPLE 6

Using a procedure analogous to that described in Example 2, 0.52 gm (97 percent of theory) of amorphous 3β-(2',3'-O-cyclohexylidene-4'-acetyl-α-L-talomethylosyl)-5β,14β-di-hydroxy-19-oxo-card-20(22)-enolide, melting range 120°–130° C, R$_v$-value 0.65 [SGHF; FA: Methyl ethyl ketone/xylene (5:2)], were obtained by reacting 0.5 gm (0.8 millimols) of 3β-(2',3'-O-cyclohexylidene-α-L-talomethylosyl)-5β,14β-dihydroxy-19-oxo-card-20(22)-enolide with 3 ml of acetic acid anhydride.

EXAMPLE 7

Using a procedure analogous to that described in Example 2, 0.35 gm (57 percent of theory) of amorphous 3β-(2',3'-O-cyclohexylidene-4'-benzofuroyl-α-L-talomethylosyl)-5β,14β-dihydroxy-19-oxo-card-20(22)-enolide, melting range 110°–115° C, R$_f$-value 0.6 [SGHF; FA: Methyl ethyl ketone/xylene (5:2)], were obtained by reacting 0.5 gm (0.8 millimols) of 3β-(2',3'-O-cyclohexylidene-α-L-talomethylosyl)-5β,14β-di-hydroxy-19-oxo-card-20(22)-enolide with 1 gm (3 millimols) of coumarilic acid anhydride in pyridine/dioxane.

EXAMPLE 8

Using a procedure analogous to that described in Example 1, 1.05 gm (80 percent of theory) of amorphous 3β-(2',3'-O-cycloheptylidene-α-L-talomethylsoyl)-5β,14β-dihydroxy-19-oxo-card-20(22)-enolide, melting range 110°–115° C, $R_f$-value 0.55 [SGHF; FA:Methyl ethyl ketone/xylene (5:2)], specific rotation $[\alpha]_D^{20} = -3.6°$ (c = 0.5, chloroform), were obtained by reducing 1.3 gm (2 millimols) of 3β-(2',3'-O-cycloheptylidene-4'-oxo-α-L—rhamnosyl)-5β,14β-dihydroxy-19-oxo-card-20(22)-enolide with 1 gm (4 millimols) of lithium tri-tert·butoxy aluminum hydride.

EXAMPLE 8

Using a procedure analogous to that described in Example 1, 0.48 gm (91 percent of theory) of amorphous 3β-(2',3'-O-cycloheptylidene-4'-acetyl-α-L-talomethylosyl)-5β,14β-dihydroxy-19-oxo-card-20(22)-enolide, melting range 120°–125° C, $R_f$-valve 0.65 [SGHF; FA: Methyl ethyl ketone/xylene (5:2)],specific rotation $[\alpha]_D^{20} = +0.3°$ (c = 1, chloroform), were obtained by reacting 0.5 gm (0.77 millimols) of 3β-(2',3',-O-cycloheptylidene-α-L—rhomnosyl)-5β,14β-dihydroxy-19-oxocard-20(22)-enolide with 3 ml of acetic acid anhydride in pyridine.

EXAMPLE 10

5β,14β-dihydroxy-19-oxo-card-20(22)-enolide

A solution of 2.9 gm (5 millimols) of 3β-(2',3'-O-isopropylidene-α-L-talomethylosyl)-5β,14β-dihydroxy-19-oxocard-20(22)-enolide in 50 ml of ethanol and 30 ml of water was admixed with 12 ml of 2N sulfuric acid, and the mixture was allowed to react for two hours at 50° C. Thereafter, the reaction mixture was neutralized with 2N ammonia and then concentrated by evaporation in vacuo. The crystalline precipitate formed thereby was collected and recrystallized from ethanol/water (1:1), yielding 2.3 gm (85 percent of theory) of the compound of the formula

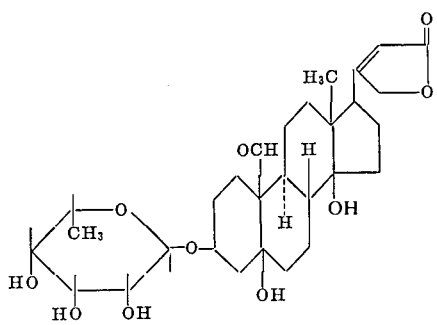

m.p. 245°–246° C, $R_f$-value 0.4 (SGHF; FA: Methyl ethyl ketone).

EXAMPLE 11

Using a procedure analogous to that described in Example 2, 1.15 gm (94 percent of theory) of amorphous 3β-(2',3',4'-triacetyl-α-L-talomethylosyl)-5β,14β-dihydroxy-19-oxocard-20(22)-enolide, melting range 142°–145° C, $R_f$-value 0.6 [SGHF; FA: Methyl ethyl ketone/xylene (5:2)], of the formula

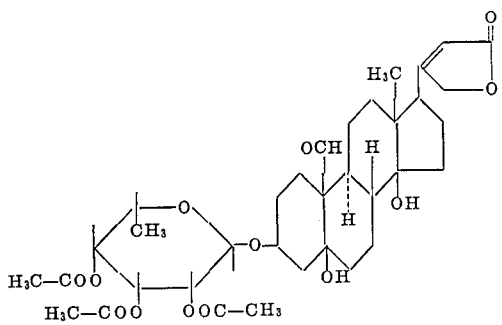

were obtained by reacting 1.0 gm (1.82 millimols) of 3β-(α-L-talomethylosyl)-5β,14β-dihydroxy-19-oxocard-20(22)-enolide with 10 ml of acetic acid anhydride in pyridine.

EXAMPLE 12

Using a procedure analogous to that described in Example 1, 0.5 gm (92 percent of theory) of 3β-(2',3',4'-triacetyl-α-L-talomethylosyl)-5β,14β-19-trihydroxy-card-20(22)-enolide, melting point 285°–286° C, $R_f$-value 0.45 [SGHF; FA: Methyl ethyl ketone/xylene (5:2)], of the formula

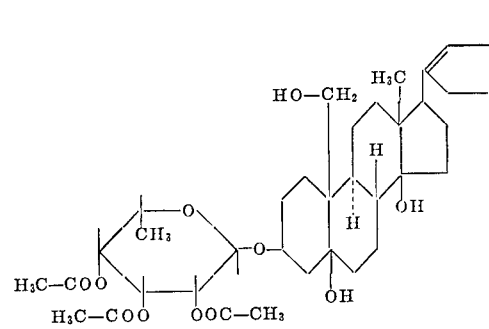

were obtained by reducing 0.54 gm (0.8 millimols) of 3β-(2',3',4'-triacetyl-α-L-talomethylosyl)-5β,14β-dihydroxy-19-oxocard-20(22)-enolide with 0.4 gm (1.6 millimols) of lithium tri-tert·butoxy aluminum hydride, but omitting the column separation.

EXAMPLE 13

Using a procedure analogous to that described in Example 2, 0.91 gm (94 percent of theory) of amorphous 3β-(2',3',4'-tripropionyl-α-L-talomethylosyl)-5β,14β-dihydroxy-19-oxocard-20(22)-enolide, melting range 120°–130° C, $R_f$-value 0.7 [SGHF; FA: Methyl ethyl ketone/xylene (5:2)], specific rotation $[\alpha]_D^{20} = -29.9°$ (c = 1, chloroform), were obtained by reacting 0.75 gm (1.3 millimols) of 3β-(α-L-talomethylosyl)-5β,14β-dihydroxy-19-oxo-card-20(22)-enolide with 2 ml of propionic acid anhydride in pyridine.

EXAMPLE 14

Using a procedure analogous to that described in Example 2, 0.9 gm (87 percent of theory) of amorphous 3β-(2',3',4'-tributyryl-α-L-talomethylosyl)-5β,14β-dihydroxy-19-oxo-card-20(22)-enolide, melting range 115°–120° C, $R_f$-value 0.7 [SGHF; FA: Methyl ethyl ketone/xylene (5:2)], specific rotation $[\alpha]_D^{20} = -22.1°$ (c = 1, chloroform), were obtained by reacting 0.75 gm (1.3 millimols) of 3β-(α-L-talomethylosyl)-5β,14β-dihydroxy-19-oxo-card-20(22)-enolide with 2 ml of butyric acid anhydride in pyridine.

EXAMPLE 15

3β-(2',3'-O-Isopropylidene-α-L-talomethylosyl)-14β-hydroxy-card-20(22)-enolide

A solution of 1.6 gm (2.85 millimols) of 3β-(2',3'-O-isopropylidene-4'-oxo-α-L-rhamnosyl)-14β-hydroxy-card-20 (22)-enolide in 50 ml of tetrahydrofuran was cooled to 0° C, and 1.6 gm (6.5 millimols) of lithium tri-tert-butoxy aluminum hydride were added. The completion of the reaction was determined by thin-layer chromatography; the temperature of the reaction mixture rose to room temperature during that period. After the reaction had gone to completion, the reaction solution was neutralized with aqueous 10 percent acetic acid, extracted twice with chloroform, and the combined organic extracts were washed with sodium bicarbonate, dried with sodium sulfate, and evaporated to dryness in vacuo, leaving 1.4 gm (87.5 percent of theory) of the amorphous compound of the formula

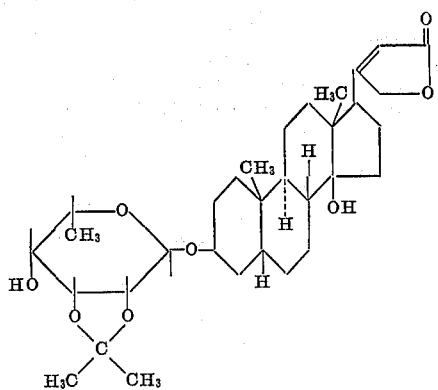

melting range 105°–110° C, $R_f$-value 0.5 [SGHF; FA: Methyl ethyl ketone/xylene (1:1)], specific rotation $[\alpha]_D^{20} = -17.3°$ (c = 1, chloroform).

EXAMPLE 16

Using a procedure analogous to that described in Example 10, 2.9 gm (90 percent of theory) of 3β-(α-L-talomethylosyl)-14β-hydroxy-card-20(22)-enolide, melting point 238°–240° C, $R_f$-value 0.25 [SGHF; FA: Methyl ethyl ketone/xylene (5:2)], specific rotation $[\alpha]_D^{20} = -40.3°$ (c = 1, chloroform/methanol = 1:1), were obtained by hydrolizing 3.5 gm (6.2 millimols) of 3β-(2',3'-O-isopropylidene-α-L-talomethylosyl)-14β-hydroxy-card-20(22)-enolide with 2N sulfuric acid and recrystallizing the product from methanol.

EXAMPLE 17

Using a procedure analogous to that described in Example 2, 0.8 gm (83.5 percent of theory) of amorphous 3β-(2',3'-O-isopropylidene-4'-acetyl-α-L-talomethylosyl)-14β-hydroxy-card-20(22)-enolide, melting range 105°–110° C, $R_f$-value 0.6 [SGHF; FA: Methyl ethyl ketone/xylene (1:1)], specific rotation $[\alpha]_D^{20} = -19.2°$ (c = 1, chloroform), were obtained by reacting 0.9 gm (1.6 millimols) of 3β-(2',3'-O-isopropylidene-α-L-talomethylosyl)-14β-hydroxy-card-20(22)-enolide with 3 ml of acetic acid anhydride in pyridine.

EXAMPLE 18

Using a procedure analogous to that described in Example 2, 0.45 gm (68 percent of theory) of amorphous 3β-(2',3'-O-isopropylidene-4'-isonicotinoyl-α-L-talomethylosyl)-14β-hydroxy-card-20(22)-enolide, melting range 130°–140° C, $R_f$-value 0.5 [SGHF; FA: Methyl ethyl ketone/xylene [1:1)], were obtained by reacting 0.56 gm (1 millimol) of 3β-(2',3'-O-isopropylidene-α-L-talomethylosyl)-14β-hydroxy-card-20(22)-enolide with 1 gm (4 millimols) of isonicotinic acid anhydride and pyridine/dioxane.

EXAMPLE 19

Using a procedure analogous to that described in Example 2, 0.6 gm (85 percent of theory) of amorphous 3β-(2',3'-O-isopropylidene-4'-benzofuroyl-α-L-talomethylosyl)-14β-hydroxy-card-20(22)-enolide, melting range 136°–143° C, $R_f$-value 0.6 [SGHF; FA: Methyl ethyl ketone/xylene (1:1)], were obtained by reacting 0.56 gm (1 millimol) of 3β-(2',3'-O-isopropylidene-α-L-talomethylosyl)-14β-hydroxy-card-20(22)-enolide with 1 gm (3 millimols) of coumarilic acid anhydride in pyridine/dioxane.

EXAMPLE 20

Using a procedure analogous to that described in Example 2, 0.5 gm (78 percent of theory) of 3β-(2',3',4'-triacetyl-α-L-talomethylosyl)-14β-hydroxy-card-20(22)-enolide, melting range 275°–278° C, $R_f$-value 0.4 [SGHF; FA: Methyl ethyl ketone/xylene (1:1)], were obtained by reacting 0.52 gm (1.0 millimol) of 3-β-(α-L-talomethylosyl)-14β-hydroxy-card-20(22)-enolide with 8 ml of acetic acid anhydride in pyridine, and recrystallization of the product from acetone/ether.

EXAMPLE 21

Using a procedure analogous to that described in Example 15, 0.9 gm (75 percent of theory) of amorphous 3β-(2',3'-O-benzylidene-α-L-talomethylosyl)-14β-hydroxy-card-20(22)-enolide, melting range 120°–130° C, $R_f$-value 0.6 [SGHF; FA: Methyl ethyl ketone/xylene (1:1)], specific rotation $[\alpha]_D^{20} = -29.2°$ (c = 1, chloroform), of the formula

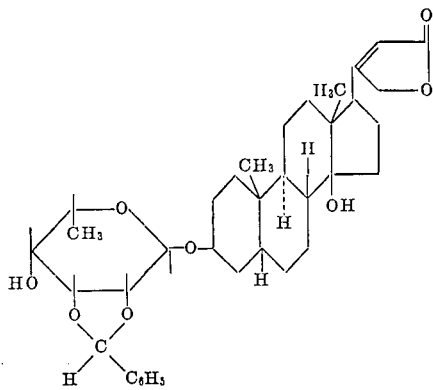

were obtained by reducing 1.2 gm (2 millimols) of 3β-(s', 3'-O-benzylidene-4'-oxo-α-L-rhamnosyl)-14β-hydroxy-card-20(22)-enolide with 1.2 gm (4.8 millimols) of lithium tri-tert. butoxy aluminum hydride.

EXAMPLE 22

Using a procedure analogous to that described in Example 2, 0.41 gm (63 percent of theory) of 3β-(2',3'-O-benzylidene-4'-acetyl-α-L-talomethylosyl)-14β-hydroxy-card-20(22)-enolide, melting point 235°–240° C, $R_f$-value 0.65 [SGHF; FA: Methyl ethyl ketone/xylene (1:1)], were obtained by reacting 0.6 gm (1 millimol) of 3β-(2',3'-O-benzylidene-α-L-talomethylosyl)-14β-hydroxy-card-20(22)-enolide with 5 ml of acetic acid anhydride and recrystallizing the product from ether/n-hexane.

EXAMPLE 23

Using a procedure analogous to that described in Example 15, 0.9 gm (90 percent of theory) of 3β-(2',3'-O-cyclohexylidene-α-L-talomethylosyl)-14β-hydroxy-card-20(22)-enolide, melting range 105°–110° C, $R_f$-value 0.4 [SGHF; FA: Methyl ethyl ketone/xylene (1:1)], were obtained by reducing 1 gm (1.67 millimols) of 3β-(2',3'-O-cyclohexylidene-4'-oxo-α-L-rhamnosyl)-14β-hydroxy-card-20(22)-enolide with 1 gm (4 millimols) of lithium tri-tert·butoxy aluminum hydride.

EXAMPLE 24

Using a procedure analogous to that described in Example 2, 0.3 gm (81 percent of theory) of amorphous 3β-(2',3'-O-cyclohexylidene-4'-acetyl-α-L-talomethylosyl)-14β-hydroxycard-20(22)-enolide, melting range 90°–105° C, $R_f$-value 0.5 [SGHF; FA: Methyl ethyl ketone/xylene (1:1)], were obtained by reacting 0.4 gm (0.67 millimol) of 3β-(2',3'-O-cyclohexylidene-α-L-talomethylosyl)-14β-hydroxy-card-20(22)-enolide with 2 ml of acetic acid anhydride in pyridine.

EXAMPLE 25

Using a procedure analogous to that described in Example 15, 1.2 gm (67 percent of theory) of amorphous 3β-(2',3'-O-cycloheptylidene-α-L-talomethylosyl)-14β-hydroxy-card-20(22)-enolide, melting range 85°–90° C, $R_f$-value 0.65 [SGHF; FA: Methyl ethyl ketone/xylene (1:1)], were obtained by reducing 1.8 gm (3 millimols) of 3β-(2',3'-O-cycloheptylidene-4'-oxo-α-L-rhamnosyl)-14β-hydroxy-card-20(22)-enolide with 1.8 gm (7.2 millimols) of lithium tri-tert·butoxy aluminum hydride.

EXAMPLE 26

Using a procedure analogous to that described in Example 2, 0.6 gm (94 percent of theory) of amorphous 3β-(2',3'-O-cycloheptylidene-4'-acetyl-α-L-talomethylosyl)-14β-hydroxycard-20(22)-enolide, melting range 85°–90° C, $R_f$-value 0.7 [SGHF; FA: Methyl ethyl ketone/xylene (1:1)], specific rotation $[\alpha]_D^{20} = -15.2°$ (c = 1, chloroform), were obtained by reacting 0.6 gm (0.98 millimol) of 3β-(2',3'-O-cycloheptylidene-α-L-talomethylosyl)-14β-hydroxy-card-20(22)-enolide with 5 ml of acetic acid anhydride in pyridine.

EXAMPLE 27

Using a procedure analogous to that described in Example 2, 0.9 gm (86 percent of theory) of amorphous 3β-(2',3'-O-cycloheptylidene-4'-isonicotinoyl-α-L-talomethylosyl)-14β-hydroxy-card-20(22)-enolide, melting range 120°–130° C, $R_f$-value 0.55 [SGHF; FA: Methyl ethyl ketone/xylene (1:1)], were obtained by reacting 0.9 gm (1.45 millimols) of 3β-(2',3'-O-cycloheptylidene-α-L-talomethylosyl)-14β-hydroxy-card-20(22)-enolide with 4 gm (17 millimols) of isonicotinic anhydride anhydri;e in pyridine/dioxane.

EXAMPLE 28

Using a procedure analogous to that described in Example 2, 0.49 gm (71 percent of theory) of 3β-(2',3',4'-tripropionyl-α-L-talomethylosyl)-14β-hydroxy-card-20(22)-enolide, melting point 201°–204° C, $R_f$-value 0.7 [SGHF; FA: Methyl ethyl ketone/xylene (1:1)], specific rotation $[\alpha]_D^{20} = -39.5°$, (c = 1, chloroform), were obtained by reacting 0.52 gm (1 millimol) of 3β-(α-L-talomethylosyl)-14β-hydroxy-card-20(22)-enolide with 2 ml of propionic acid anhydride in pyridine, and recrystallizing the product from ether/n-hexane.

EXAMPLE 29

Using a procedure analogous to that described in Example 2, 0.38 gm (52 percent of theory) of amorphous 3β-(2',3',4'-tributyryl-α-L-talomethylosyl)-14β-hydroxy-card-20(22)-enolide, melting range 70°–80° C, $R_f$-value 0.7 [SGHF; FA: Methyl ethyl ketone/xylene (1:1)], were obtained by reacting 0.52 gm (1 millimol) of 3β-(α-L-talomethylosyl)-14β-hydroxycard-20(22)-enolide with 2 ml of butyric acid anhydride in pyridine.

EXAMPLE 30

Using a procedure analogous to that described in Example 15, 0.95 gm (95 percent of theory) of amorphous 3β-(2',3'-O-cyclohexylidene-α-L-talomethylosyl)-5β,14β-dihydroxy-19-oxo-bufa-20,22-dienolide, melting range 125°–130° C, $R_f$-value 0.25 [SGHF; FA: Methyl ethyl ketone/xylene (1:1)], of the formula

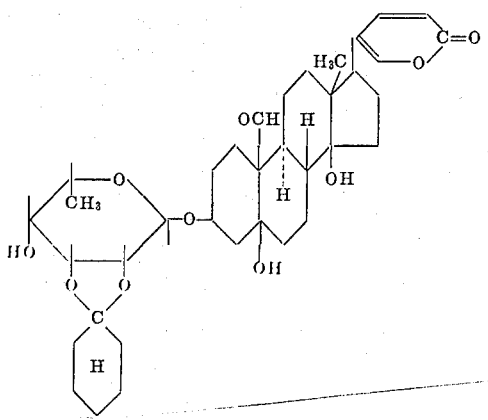

were obtained by reducing 1 gm (1.55 millimols) of 3β-(2',3'-O-cyclohexylidene-4'-oxo-α-L-rhamnosyl)-5β,14β-dihydroxy-19-oxo-bufa-20,22-dienolide for 3 minutes at 0° C with 0.85 gm (3.3 millimols) of lithium tri-tert-butoxy aluminum hydride.

EXAMPLE 31

Using a procedure analogous to that described in Example 2, 0.5 gm (93 percent of theory) of amorphous 3β-(2',3'-O-cyclohexylidene-4'-acetyl-α-L-talomethylosyl)-5β,14β-dihydroxy-19-oxo-bufa-20,22-dienolide, melting range 118°–125° C, $R_f$-value 0.3 [SGHF; FA: Methyl ethyl ketone/xylene (1:1)], were obtained by reacting 0.5 gm (0.78 millimol) of 3β-(2',3'-O-cyclohexylidene-α-L-talomethylosyl)-5β,14β-dihydroxy-19-oxo-bufa-20,22-dienolide with 2.5 ml of acetic acid anhydride in pyridine.

EXAMPLE 32

3β-(2',3'-O-Isopropylidene-α-L-talomethylosyl)-14β-hydroxy-19-oxo- and 19-hydroxy-bufa-4,20,22-trienolides Using a procedure analogous to that described in Example 1, 5 gm (8.6 millimols) of 3β-(2',3'-O-isopropylidene-4'-oxo-α-L-rhamnosyl)-14β-hydroxy-19-oxo-bufa-4,20,22-trienolide were reduced with 4.8 gm (18.9 millimols) of lithium tri-tert-butoxy aluminum hydride, yielding a mixture of about equal amounts of the corresponding talomethylosyl-19-oxo- and 19-hydroxy-compounds. The mixture was separated by chromatography on a silicagel (neutral, 0.2–0.5 mm grain size) column with chloroform/ethanol (40:1 to 30:1), yielding a. 1.5 gm (30 percent of theory) of amorphous 3β-(O-isopropylidene-α-L-talomethylosyl)-14β-hydroxy-19-oxo-bufa-4,20,22-trienolide, melting range 135°–145° C, $R_f$-value 0.65 [SGHF; FA: Methyl ethyl ketone/xylene (5:2)], of the formula

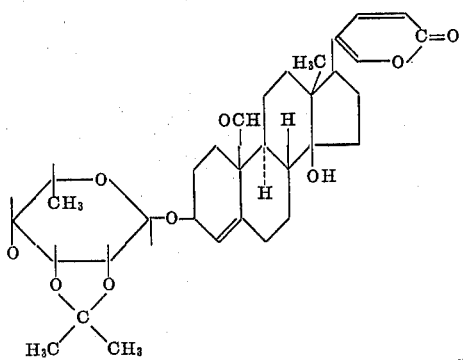

and b. 1 gm (21 percent of theory) of amorphous 3β-(2',3'-O-isopropylidene-α-L-talomethylosyl)-14β,19-dihydroxy-bufa-4,20, 22-trienolide, melting range 125°–145° C, $R_f$-value 0.45 [SGHF; FA: Methyl ethyl ketone/xylene (5:2)], of the formula

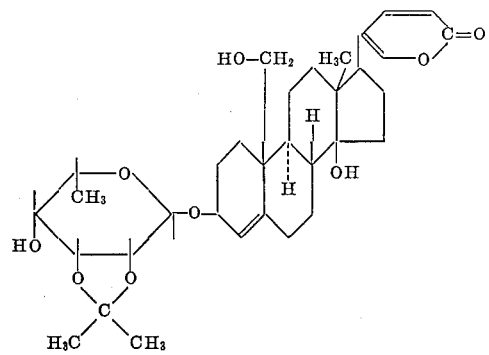

EXAMPLE 33

Using a procedure analogous to that described in Example 1, 0.35 gm (19 percent of theory) of amorphous 3β-(2',3'-O-benzylidene-α-L-talomethylosyl)-14β-hydroxy-19-oxo-bufa-4,20, 22-trienolide, melting range 124°–136° C, $R_f$-value 0.62 [SGHF; FA: Methyl ethyl ketone/xylene (5:2)], were obtained by reducing 1.85 gm (2.9 millimols) of 3β-(2',3'-O-benzylidene-4'-oxo-α-L-rhamnosyl)-14β-hydroxy-19-oxo-bufa-4,20,22-trienolide with 1.7 gm (6.5 millimols) of lithium tri-tert-butoxy aluminum hydride, followed by chromatographic separation as described in Example 32.

EXAMPLE 34

Using a procedure analogous to that described in Example 1, 0.9 gm (17 percent of theory) of amorphous 3β-(2',3'-O-cyclohexylidene-α-L-talomethylosyl)-14β-hydroxy-19-oxo-bufa-4,20,22-trienolide, melting range 210°–230° C, $R_f$-value 0.7 [SGHF; FA:Methyl ethyl ketone/xylene (5:2)], were obtained by reducing 5.4 gm (8.7 millimols) pf 3β-(2',3'-O-cyclohexylidene-4'-oxo-α-L-rhamnosyl)-14β-hydroxy-19-oxo-bufa-4,20,22-enolide with 5 gm (19.7 millimols) of lithium tri-tert-butoxy aluminum hydride, followed by chromatographic separation as described in Example 32.

EXAMPLE 35

Using a procedure analogous to that described in Example 1, 0.45 gm (34.5 percent of theory) of amorphous 3β-(2',3'-O-cycloheptylidene-α-L-talomethylosyl)-14β-hydroxy-19-oxobufa-4,20,22-trienolide, melting range 140°–155° C, $R_f$-value 0.72 [SGHF; FA: Methyl ethyl ketone/xylene (5:2)], were obtained by reducing 1.3 gm (2.04 millimols) of 3β-(2',3'-O-cycloheptylidene-4'-oxo-α-L-rhamnosyl)-14β-hydroxy-19-oxobufa-4,20,22-trienolide with 1.2 gm (4.7 millimols) of lithium tri-tert-butoxy aluminum

EXAMPLE 36

Using a procedure analogous to that described in Example 10, 0.45 gm (56 percent of theory) of amorphous 3β-(α-L-talomethylosyl)-14β-hydroxy-19-oxo-bufa-4,20,22-trienolide, melting range 120°–133° C, $R_f$-value 0.15 [SGHF; FA: Methyl ethyl ketone/xylene (5:2)], were obtained by hydrolizing 0.9 gm (1.4 millimols) of 3β-(2',3'-O-cyclohexylidene-α-L-talomethylosyl)-14β-hydroxy-19-oxo-bufa-4,20,22-trienolide with 2N sulfuric acid.

EXAMPLE 37

Using a procedure analogous to that described in Example 2, 0.42 gm (79 percent of theory) of 3β-(2',3',4'-triacetyl-α-L-talomethylosyl)-14β-hydroxy-19-oxo-bufa-4,20,22-trienolide, melting range 230°–245° C, $R_f$-value 0.55 [SGHF; FA: Methyl ethyl ketone/xylene (5:2)], were obtained by reacting 0.43 gm (0.79 millimol) of 3β-(α-L-talomethylosyl)-14β-hydroxy-19-oxo-bufa-4,20,22-trienolide with 2 ml of acetic acid anhydride in pyridine.

EXAMPLE 38

Using a procedure analogous to that described in Example 10, 0.07 gm (80 percent of theory) of amorphous 3β-(4'-acetyl-α-L-talomethylosyl)-5β,14β-dihydroxy-19-oxo-card-20 (22)-enolide, melting range 115°–125° C, $R_f$-value 0.35 [SGHF; FA: Methyl ethyl ketone/xylene (5:2)], of the formula

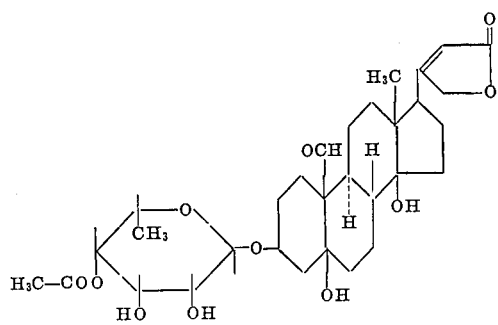

were obtained by hydrolizing 0.1 gm (0.15 millimol) of 3β-(2',3'-O-cyclohexylidene-4'-acetyl-α-L-talomethylosyl)-5β,14β-dihydroxy-19-oxo-card-20(22)-enolide with 2N sulfuric acid.

EXAMPLE 39

Using a procedure analogous to that described in Example 10, 0.90 gm (95 percent of theory) of 3β-(4'-acetyl-α-L-talomethylosyl)-14β-hydroxy-card-20(22)-enolide, melting point 210°–213° C, $R_f$-value 0.45 [SGHF; FA: Methyl ethyl ketone/xylene (1:1)], were obtained by hydrolizing 1 gm (1.67 millimols) of 3β-(2',3'-O-isopropylidene-4'-acetyl-α-L-talomethylosyl)-14β-hydroxy-card-20(22)-enolide with 2N sulfuric acid.

EXAMPLE 40

3β-(2',3'-O-Isopropylidene-α-L-talomethylosyl)-14β-hydroxybufa-4,20,22-trienolide A solution of 0.5 gm (0.88 millimols) of 3β-(2',3'-O-isopropylidene-4'-oxo-α-L-rhamnosyl)-14β-hydroxybufa-4, 20,22-trienolide in 8 ml of methanol was admixed at 0° C with 85 mgm (2.2 millimols) of sodium borohydride, and the mixture was stirred for 45 minutes on an ice bath. Thereafter, the excess sodium borohydride was destroyed by addition of 2N acetic acid, the reaction solution was diluted with ethyl acetate, then washed first with saturated aqueous sodium bicarbonate and subsequently with water, dried over sodium sulfate, the solvent was evaporated in vacuo, and the residue was chromatographed on aluminum oxide (activity III, neutral) with benzene/ethyl acetate (7:3). 0.45 gm (90 percent of theory) of the compound of the formula

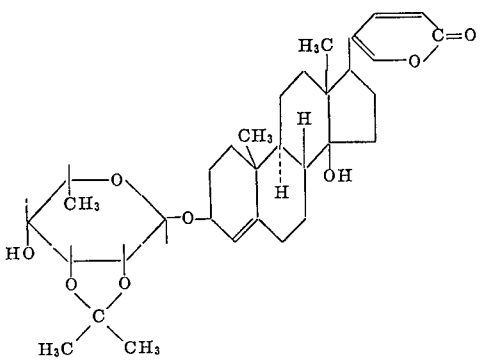

were obtained.

Melting range: 124°–142° C (methylene chloride/hexane).

$R_f$-value 0.65 [SGHF; FA: Ethyl acetate/ethanol (98.2)]

EXAMPLE 41

3β-(2',3'-O-Isopropylidene-4'-acetyl-α-L-talomethylosyl)-14β-hydroxy-bufa-4,20,22-trienolide A solution of 0.4 gm (0.702 millimol) of the end product of Example 40 in 4 ml of pyridine was admixed with 4 ml of acetic acid anhydride, and the mixture was heated for three hours on a steam bath. Thereafter, the reaction solution was allowed to cool and was then poured into 500 ml of ice water. The precipitate formed thereby was collected by vacuum filtration, washed several times with water and dried, yielding 0.3 gm (70 percent of theory) of the compound of the formula

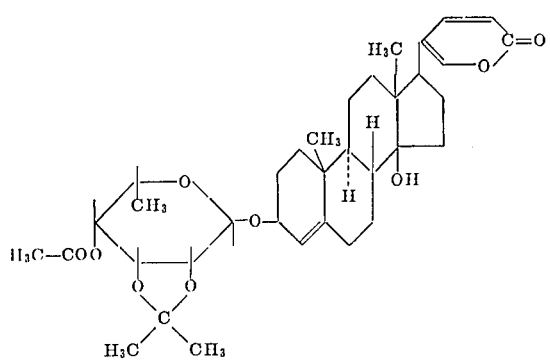

Melting range: 123°–133° C (ether/petroleum ether)
Specific rotation: $[\alpha]_D^{20} = -53.9°$ (c = 0.9, chloroform).
$R_f$-Value: 0.70 [SGHF; FA: Ethyl acetate/ethanol (98:2)].

EXAMPLE 42

3β-(2',3'-O-Cyclohexylidene-α-L-talomethylosyl)-14β-hydroxybufa-4,20,22-trienolide A solution of 1.4 gm (2.3 millimols) of 3β-(2',3'-O-cyclohexylidene-4'-oxo-α-L-rhamnosyl)14β-hydroxybufa-4, 20,22-trienolide in 15 ml of methanol was admixed with 90 mgm (2.3 millimols) of sodium borohydride, and the mixture was stirred for 30 minutes on an ice bath. Thereafter, the excess sodium borohydride was destroyed by addition of 2N acetic acid, the resulting solution was washed first with saturated aqueous sodium bicarbonate and then with water, dried over sodium sulfate, the solvent was evaporated in vacuo, and the residue was chromatographically purified on aluminum oxide (activity III, neutral) with benzene to which increasing amounts of ethyl acetate were added. 1.32 gm (94 percent of theory) of the compound of the formula

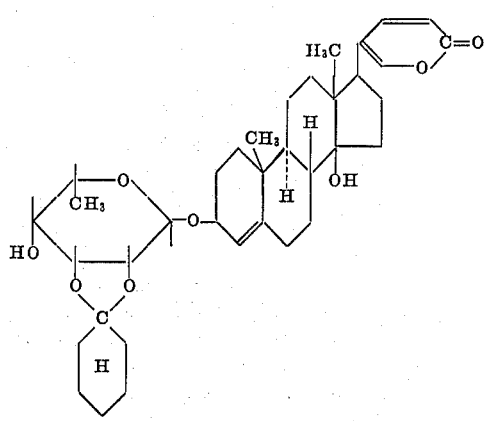

were obtained.
Melting range: 133°–134° C (Methylene chloride/hexane).
Specific rotation: $[\alpha]_D^{20} = -46.9°$ (c = 0.94, chloroform).
$R_f$-Value: 0.65 [SGHF; FA: Ethyl acetate].

EXAMPLE 43

3β-(2',3'-O-Cyclohexylidene-4'-acetyl-α-L-talomethylosyl)-14β-hydroxy-bufa-4,20,22-trienolide A solution of 0.77 gm (1.26 millimols) of the end product of Example 42 in 8 ml of pyridine was admixed with 7 ml of acetic acid anhydride, and the mixture was heated for three hours on a steam bath. Thereafter, the reaction solution was allowed to cool, was then poured into 400 ml of ice water, and the precipitate formed thereby was collected by vacuum filtration, carefully washed with water and dissolved in methylene chloride. The resulting solution was dried overnight with sodium sulfate and was then evaporated to dryness in vacuo. 0.82 gm (99.5 percent of theory) of the compound of the formula

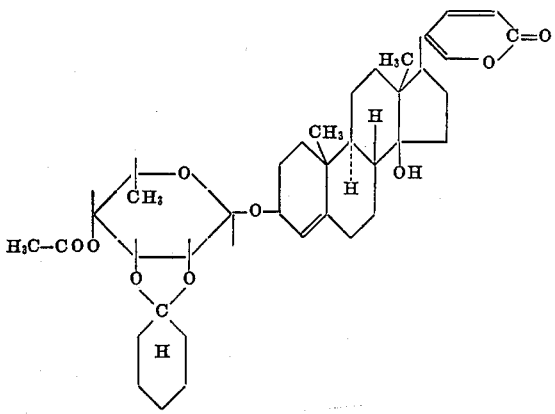

was obtained.
Melting range: 132°–145° C (Methylene chloride/hexane).
Specific rotation: $[\alpha]_D^{20} = -43.3°$ (c = 1.29, chloroform).
$R_f$-Value: 0.60 [SGHF; FA: Ethyl acetate/benzene (4:1)].

EXAMPLE 44

3β-(2',3'-O-Benzylidene-α-L-talomethylosyl)-14β-hydroxybufa-4,20,22-trienolide

A solution of 1.65 gm (2.7 millimols) of 3β-(2',3'-O-benzylidene-4'-oxo-α-L-rhamnosyl)-14β-hydroxybufa-4,20, 22-trienolide in 15 ml of methanol was admixed at 0° C with 100 mgm (2.4 millimols) of sodium borohydride, and the mixture was stirred for 45 minutes on an ice bath. Thereafter, the excess sodium borohydride was destroyed by addition of 2N acetic acid, the resulting solution was diluted with ethyl acetate and then washed first with saturated aqueous sodium bicarbonate and subsequently with water, dried over sodium sulfate, the solvent was evaporated in vacuo, and the residue was chromatographed on aluminum oxide (activity III, neutral) with benzene/ethyl acetate (8:2). 1.45 gm (88 percent of theory) of the compound of the formula

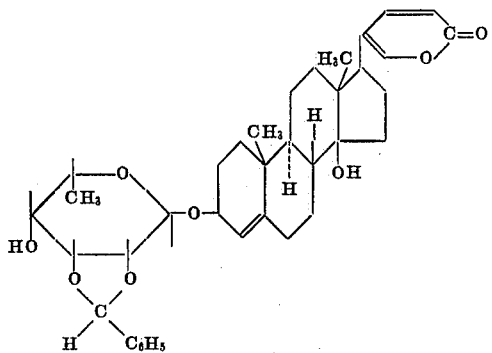

were obtained.
Melting range: 135°–150° C (Methylene chloride/hexane).
Specific rotation: $[\alpha]_D^{20} = -61.5°$ (c = 0.76, chloroform).
$R_f$-Value: 0.60 [SGHF; FA: Ethyl acetate/benzene (4:1)].

EXAMPLE 45

3β-(2′,3′-O-Benzylidene-4′-acetyl-α-L-talomethylosyl)-14β-hydroxy-bufa-4,20,22-trienolide A solution of 0.9 gm (1.45 millimols) of the end product of Example 44 in 9 ml of pyridine was admixed with 9 ml of acetic acid anhydride, and the mixture was heated for three hours on a steam bath. Thereafter, the reaction solution was allowed to cool, was then poured into 500 ml of ice water, and the precipitate formed thereby was collected by vacuum filtration, washed several times with water and dried. 0.9 gm (96 percent of theory) of the compound of the formula

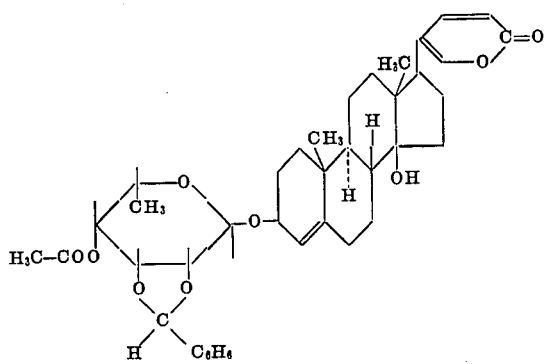

were obtained.
Specific rotation: $[\alpha]_D^{20} = -57.2°$ (c = 0.63, chloroform).
$R_f$-Value: 0.65 [SGHF; FA: Ethyl acetate/benzene (4:1)].

EXAMPLE 46

3β-(αL-Talomethylosyl)-14β-hydroxy-bufa-4,20,22-trienolide

A solution of 1.9 gm (3.3 millimols) of the end product of Example 40 in 85 ml of ethanol was diluted with an equal volume of water, then acidified with 2.3 ml of aqueous 10 percent sulfuric acid, and the acidic mixture was allowed to stand overnight at room temperature. Thereafter, the reaction solution was diluted with water and then extracted several times with ethyl acetate. The combined organic extracts were washed first with saturated aqueous sodium bicarbonate and then with water, evaporated to dryness in vacuo, and the residue was purified by chromatography on a dry column of aluminum oxide, using ethyl acetate as the flow agent. The product was eluted with ethanol, and the ethanolic eluate was filtered through a hard filter and evaporated in vacuo. 1.5 gm (85 percent of theory) of the compound of the formula

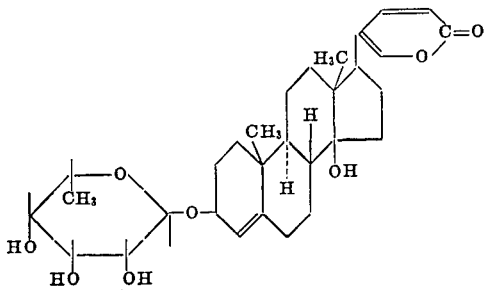

were obtained.
Melting range: 200°–210° C (Acetone/hexane).
Specific rotation $[\alpha]_D^{20} = -96.2°$ (c = 0.76, methanol).
$R_f$-Value: 0.50 [SGHF; FA: Ethyl acetate/ethanol (95:5)].

EXAMPLE 47

3β-(4′-Acetyl-α-L-talomethylosyl)-14β-hydroxy-bufa-4,20,22-trienolide

A solution of 2.3 gm (3.75 millimols) of the end product of Example 41 in 115 ml of ethanol was diluted with an equal volume of water, admixed with 2.62 ml of aqueous 10 percent sulfuric acid, and the mixture was allowed to stand at room temperature for five days. Thereafter, the reaction solution was diluted with water and extracted several times with ethyl acetate. The combined organic extracts were washed first with saturated aqueous sodium bicarbonate and then with water, and were subsequently evaporated to dryness in vacuo. The residue was purified by chromatography on silicagel, using as the eluant chloroform to which increasing amounts of acetone were added. 1.25 gm (55.8 percent of theory) of the compound of the formula

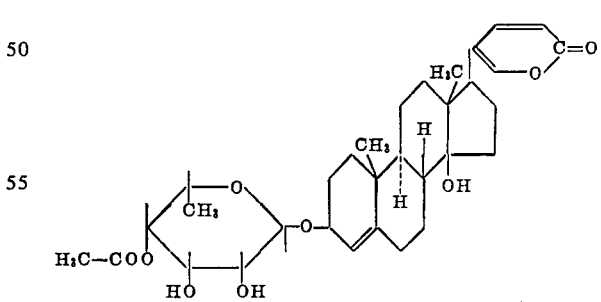

were obtained.
Melting point: 220°–226° C.

R_f-Value: 0.3 (SGHF; FA: Ethyl acetate).

EXAMPLE 48

3β-(2',3',4'-Triacetyl-α-L-talomethylosyl)-14β-hydroxy-bufa-4,20,22-trienolide

A solution of 0.7 gm (1.32 millimols) of the end product of Example 46 in 7 ml of pyridine was admixed with 7 ml of acetic acid anhydride, and the mixture was heated for three hours on a steam bath. Thereafter, the solution was allowed to cool, then poured into 500 ml of ice water, and the precipitate formed thereby was collected by filtration, washed with water, and dissolved in methylene chloride. The resulting solution was dried overnight with sodium sulfate and evaporated to dryness. 0.83 gm (96 percent of theory) of the compound of the formula

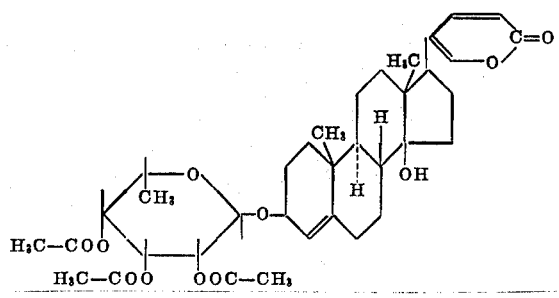

were obtained.
Melting range: 135°–139° C.
R_f-Value: 0.6 (SGHF; FA: Ethyl acetate).

EXAMPLE 49

Using a procedure analogous to that described in Example 1, 0.4 gm (68 percent of theory) of amorphous 3β-(2',3'-O-isopropylidene-α-L-talomethylosyl)-5β,14β,19-trihydroxy-card-20(22)-enolide, melting range 117°–125° C, R_f-value 0.3 [SGHF; FA: Methyl ethyl ketone/xylene (5:2)], of the formula

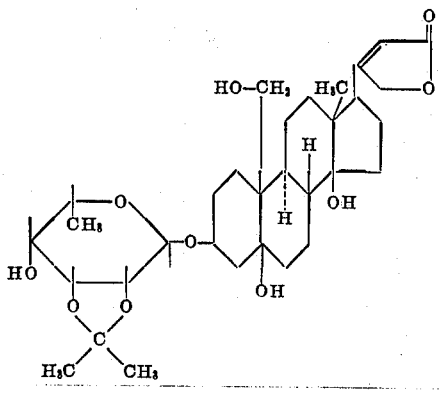

was obtained by reducing 0.59 gm (1 millimol) of 3β-(2',3'-O-isopropylidene-4'-oxo-rhamnosyl)-5β,14β-dihydroxy-19-oxocard-20(22)-enolide for 45 minutes with a large excess, i.e., 1.1 gm (4 millimols) of lithium tri-tert-butoxy aluminum hydride.

The compounds according to the present invention, that is, those embraced by formula I above, have useful pharmacodynamic properties. More particularly, the compounds of the instant invention exhibit cardiotonic activities in warm-blooded animals, such as cats, guinea pigs and rats, and are superior to known cardiac glycosides particularly with respect to their absorption rate.

The cardiotonic activity of the compounds according to the present invention was ascertained on guinea pigs by the method of Knaffle-Lenz, Arch. exp. Path. und Pharmakol. 82 (1910), and on cats by the method of Hatcher, Amer. J. Pharmacy 82, 360 (1910), and their absorption rate was determined on rats by the method of K. Greef, Arch. exp. Path. und Pharmakol. 135, 259 (1928).

The following specific compounds within the generic class represented by formula I are especially effective cardiotonics with a high rate of absorption:

3β-(α-L-Talomethylosyl)-14β-hydroxy-card-20(22)-enolide,

3β-(2',3'-O-Isopropylidene-4'-acetyl-α-L-talomethylosyl)-14β-hydroxy-card-20(22)-enolide, 3β-(2',3'-O-Cyclohexylidene-α-L-talomethylosyl)-14β-hydroxy-bufa-4,20,22-trienolide, 3β-(2',3',4'-Triacetyl-α-L-talomethylosyl)-14β-hydroxybufa-4,20,22-trienolide, 3β-(2',3'-O-Isopropylidene-α-L-talomethylosyl)-14β-hydroxy-card-20(22)-enolide, and 3β-(2',3'-O-Isopropylidene-α-L-talomethylosyl)-5β,14β-dihydroxy-19-oxo-card-20(22)-enolide.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective cardiotonic dosage unit of the compounds according to the present invention is from 0.002 to 0.034 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 50

Tablets

The tablet composition is compounded from the following ingredients:

|  | Parts |
|---|---|
| 3β-(α-L-Talomethylosyl)-14β-hydroxy-card-20(22)-enolide | 0.25 |
| Lactose | 85.75 |
| Potato starch | 30.00 |
| Gelatin | 3.00 |
| Magnesium stearate | 1.00 |
| Total | 120.00 |

Preparation:

The cardenolide compound is intimately admixed with 2.5 parts of lactose, the mixture is admixed with the remainder of the lactose and the potato starch, the resulting mixture is moistened with an aqueous 10 percent solution of the gelatin, the moist mass is forced through a 1.5 mm-mesh screen, the resulting granulate is dried at 40° C and again passed through a 1 mm-mesh screen, the dry granulate is admixed with the magnesium stearate, and the composition is compressed into 120 mgm-tablets in a conventional tablet making machine. Each tablet contains 0.25 mgm of the cardenolide compound and is an oral dosage unit composition with effective cardiotonic action.

EXAMPLE 51

Coated pills

The pill core composition is compounded from the following ingredients:

| | Parts |
|---|---|
| 3β-(2',3'-O-Isopropylidene-4'-acetyl-α-L-talomethylosyl)-14β-hydroxy-card-20(22)-enolide | 0.25 |
| Lactose | 32.25 |
| Corn starch | 15.00 |
| Polyvinylpyrrolidone | 2.00 |
| Magnesium stearate | 0.50 |
| Total | 50.00 |

Preparation:

The cardenolide is intimately admixed with 2.5 parts of lactose, the mixture is admixed with the remainder of the lactose and the corn starch, the resulting mixture is moistened with an aqueous 15 percent solution of the polyvinylpyrrolidone, the moist mass is forced through a 1 mm-mesh screen, the resulting granulate is dried at 40° C and again passed through the screen, the dry granulate is admixed with the magnesium stearate, and the composition is compressed into 50 mgm-pill cores which are subsequently coated with a thin shell consisting essentially of a mixture of sugar and talcum and polished with beeswax. Each coated pill contains 0.25 mgm of the cardenolide and is an oral dosage unit composition with effective cardiotonic action.

EXAMPLE 52

Drop solution

The solution is compounded from the following ingredients:

| | Parts |
|---|---|
| 3β-(2',3',4'-Triacetyl-α-L-talomethylosyl)-14β-hydroxy-bufa-4,20,22-trienolide | 0.0125 |
| Saccharin sodium | 0.3 |
| Sorbic acid | 0.1 |
| Ethanol | 30.0 |
| Flavoring | 1.0 |
| Distilled water | q.s.ad 100.0 |

Preparation:

The bufatrienolide and the flavoring are dissolved in the ethanol, the resulting solution is admixed with a solution of the sorbic acid and the saccharin sodium in the distilled water, and the mixed solution is filtered until free from suspended matter. 1 ml (about 20 drops) of the filtrate contains 0.125 mgm of the bufatrienolide and is an oral dosage unit composition with effective cardiotonic action.

EXAMPLE 53

Hypodermic solution

The solution is compounded from the following ingredients:

| | Parts |
|---|---|
| 3β-(2',3'-O-Isopropylidene-α-L-talomethylosyl)-14β-hydroxy-card-20(22)-enolide | 0.25 |
| Polyethyleneglycol 600 | 150.00 |
| Tartaric acid | 5.00 |
| Distilled water | q.s.ad 3000.00 by vol. |

Preparation:

The tartaric acid, the polyethyleneglycol and the cardenolide compound are successively dissolved in a sufficient amount of distilled water, and the resulting solution is diluted to the indicated volume with distilled water and then filtered until free from suspended matter. The filtrate is filled into 3 ml-ampules in an atmosphere of nitrogen, and the filled ampules are sterilized for 20 minutes at 120° C and then sealed. Each ampule contains 0.25 mgm of the cardenolide compound, and the contents thereof are an injectable dosage unit composition with effective cardiotonic action.

EXAMPLE 54

Suppositories

The suppository composition is compounded from the following ingredients:

| | Parts |
|---|---|
| 3β-(α-L-Talomethylosyl)-14β-hydroxycard-20(22)-enolide | 0.25 |
| Lactose | 4.75 |
| Suppository base (e.g. cocoa butter) | 1695.00 |
| Total | 1700.00 |

Preparation:

The cardenolide and the lactose are admixed with each other, the mixture is milled and then blended with the aid of an immersion homogenizer in the suppository base which had previously been melted and cooled to 40° C, and 1,700 mgm-portions of the resulting composition are poured at 37° C into cooled suppository molds and allowed to harden. Each suppository contains 0.25 mgm of the cardenolide and is a rectal dosage unit composition with effective cardiotonic action.

Analogous results are obtained when any one of the other compounds embraced by formula I is substituted for the particular steroid glycoside compound in Examples 50 through 54. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

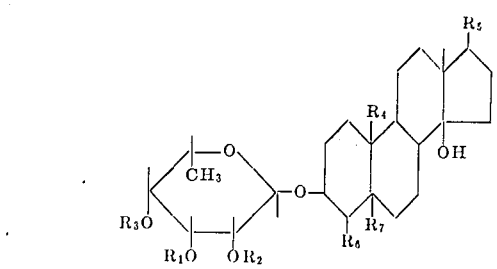

wherein $R_1$ and $R_2$ are each hydrogen or lower alkanoyl or, together with each other,

where
 A is hydrogen or lower alkyl,
 B is lower alkyl or phenyl, or
 A and B, together with each other and the carbon atom to which they are attached, form a 6- to 7-membered saturated carbocyclic ring,
$R_3$ is hydrogen, lower alkanoyl, isonicotinoyl or benzofuran-2-carbonyl,
$R_4$ is methyl, formyl or hydroxymethyl,
$R_5$ is bufadienolide; or when $R_4$ is methyl or at least one of $R_1$ to $R_3$ is other than hydrogen, $R_5$ is also cardenolide,
$R_6$ is hydrogen or, together with $R_7$, a double bond, and
$R_7$ is hydroxyl or, when $R_5$ is cardenolide, $R_7$ is also hydrogen.

2. A compound according to claim 1, which is $3\beta$-($\alpha$-L-talomethylosyl)-$14\beta$-hydroxy-card-20(22)-enolide.

3. A compound according to claim 1, which is $3\beta$-(2',3'-O-isopropylidene-4'-acetyl-$\alpha$-L-talomethylosyl)-$14\beta$-hydroxy-card-20(22)-enolide.

4. A compound according to claim 1, which is $3\beta$-(2',3'-O-cyclohexylidene-$\alpha$-L-talomethylosyl)-$14\beta$-hydroxybufa-4,20,22-trienolide.

5. A compound according to claim 1, which is $3\beta$-(2',3',4'-triacetyl-$\alpha$-L-talomethylosyl)-$14\beta$-hydroxybufa-4,20,22-trienolide.

6. A compound according to claim 1, which is $3\beta$-(2',3'-O-isopropylidene-$\alpha$-L-talomethylosyl)-$14\beta$-hydroxycard-20(22)-enolide.

7. A compound according to claim 1, which is $3\beta$-(2',3'-O-isopropylidene-$\alpha$-L-talomethylosyl)-$5\beta,14\beta$-di-hydroxy-19-oxo-card-20(22)-enolide.

* * * * *

PO-1050
(5/69)

UNITED STATES PATENT OFFICE
CERTIFICATE OF CORRECTION

Patent No. 3,783,149          Dated January 1, 1974

Inventor(s) JOACHIM HEIDER, WOLFGANG EBERLEIN, WALTER KOBINDER

It is certified that error appears in the above-identified patent and that said Letters Patent are hereby corrected as shown below:

Col. 1 line 58, "talomehyloside" should read:

- - talomethyloside - -

Col. 2 line 4, that portion of the formula which now reads

" 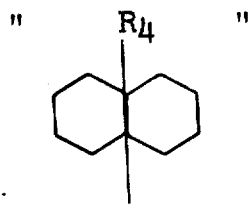 "          should read:

- - 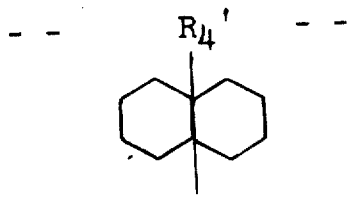 - -

Col. 7 line 23, "$R_f$-valve" should read - - $R_f$-value - -

Col. 7 line 17, "Example 8" should read - - Example 9 - -

Col. 7 line 32, before "5β,14β" insert -- 3β-(a-L-Talomethyl-
                                                           osyl - -

UNITED STATES PATENT OFFICE
CERTIFICATE OF CORRECTION

Patent No. 3,783,149   Dated January 1, 1974

Inventor(s) JOACHIM HEIDER, WOLFGANG EBERLEIN, WALTER KOBINDER

It is certified that error appears in the above-identified patent and that said Letters Patent are hereby corrected as shown below:

Col. 11 line 18, "-(s'2'- " should read -- -(2',3' --

Col. 12 line 11, "-hydroxycard¹" should read -- -hydroxy-card -

Col. 12 line 30, delete "anhydri;e"

Col. 16 line 39, "(98.2)]" should read -- (98:2)] --

Signed and sealed this 5th day of November 1974.

(SEAL)
Attest:

McCOY M. GIBSON JR.
Attesting Officer

C. MARSHALL DANN
Commissioner of Patents